United States Patent
Guebitz (12)

(10) Patent No.: US 6,747,086 B2
(45) Date of Patent: *Jun. 8, 2004

(54) POLYPROPYLENE MOLDING COMPOSITION FOR THE PRODUCTION OF MOLDING HAVING A DECORATIVE SURFACE

(75) Inventor: Franz Guebitz, Kelkheim (DE)

(73) Assignee: Basell Poliolefine Italia S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 32 days.

(21) Appl. No.: 08/456,294

(22) Filed: May 31, 1995

(65) Prior Publication Data

US 2002/0065357 A1 May 30, 2002

Related U.S. Application Data

(63) Continuation of application No. 08/082,044, filed on Jun. 24, 1993.

(30) Foreign Application Priority Data

Jun. 27, 1992 (DE) .......................................... 42 21 208

(51) Int. Cl.$^7$ ................................................ C08K 3/04
(52) U.S. Cl. ...................................... 524/495; 524/496
(58) Field of Search ................................ 524/495, 496

(56) References Cited

U.S. PATENT DOCUMENTS

| 4,107,135 A |   | 8/1978 | Duggins et al. ........... 260/42.37 |
| 4,469,138 A |   | 9/1984 | Satoh .......................... 138/174 |
| 4,720,516 A | * | 1/1988 | Kishida et al. ................ 525/64 |
| 5,269,991 A |   | 12/1993 | Gueret ......................... 264/73 |

FOREIGN PATENT DOCUMENTS

| DE | 3131152 | 1/1985 |
| EP | 0 449 685 A1 | 10/1991 |
| EP | 0 438 339 B1 | 6/1994 |

OTHER PUBLICATIONS

Polypropylene (properties and applications), D. B. Iwanukow and M. L. Friedman, p. 154, 1974. (Abstract).

JP–A 58 155 925 (Idemitsu Petrochem) Sep. 16, 1983.

* cited by examiner

*Primary Examiner*—Peter D. Mulcahy
(74) *Attorney, Agent, or Firm*—Connolly Bove Lodge & Hutz LLP

(57) ABSTRACT

Polypropylene molding composition for the production of moldings having a decorative surface A polypropylene molding composition containing from 0.3 to 3% by weight of carbon fibers having a fiber length of from 0.5 to 18 mm can be converted into moldings having a decorative surface. These moldings are used, in particular, in the interior of motor vehicles, but are also suitable for other applications.

16 Claims, No Drawings

POLYPROPYLENE MOLDING COMPOSITION FOR THE PRODUCTION OF MOLDING HAVING A DECORATIVE SURFACE

Cross-Reference to Related APPLICATION

This application is a continuation of application Ser. No. 08/082,044 filed on Jun. 24, 1993.

The invention relates to a molding composition for the production of moldings whose surface has a particular, decorative effect and which are used, in particular, in the interior of motor vehicles.

Interior trim for motor vehicles, such as covers for A, B and C columns and the like, are currently usually produced from thermoplastics by injection molding. The preferred material recently is reinforced, bulk-dyed polypropylene. For visual reasons, these parts are provided with a surface structure. These structures are generated by corresponding engraving in the injection molds. The result is moldings having a structured, colored, but homogeneous surface appearance.

In order to satisfy increased demand with respect to appearance and comfort, the trim can be painted or laminated with films or textile materials. The lamination is in each case carried out with the aid of adhesives. Depending on the nature of the support material, pretreatment of the moldings by flame treatment, corona discharge or the like is necessary in order to achieve good adhesion. These individual process steps mean relatively high costs. A further, associated disadvantage is the unfavorable fogging behavior.

Fogging is caused by condensation of (evaporated) volatile interior fittings of the motor vehicle on the windows, in particular on the windscreen. The fogging intensity is naturally dependent on a number of factors and on the prevailing temperature conditions. Since adhesives frequently contain a relatively high proportion of volatile substances, adhesive-laminated parts virtually always represent a significant fogging-promoting potential.

A further disadvantage can occur in adhesive-laminated parts with respect to design freedom. Due to the restricted deformability of textiles and films during the lamination operation, limitations may have to be taken into account with respect to the geometrical design of the support parts.

The object was therefore to find a material which, when injection molded, gives moldings which have a textile-like appearance.

It is in principle possible for colored PP, if desired additionally modified by means of reinforcing materials, such as glass fibers or talc and/or elastomers, to be provided with fibers of a different color. Thermally and mechanically highly resistant fibers of, for example thermoplastic polyester, polyamide or polyacrylonitrile can be admixed with the polypropylene in an amount of from about 0.5 to 3% and homogeneously mixed with the polymer in extruders. Test sheets produced therefrom and provided with a grained surface had a textile-like appearance. However, attempts to produce large-area moldings in which geometrically required long flow paths are present had proceeded unsatisfactorily. The reason was inadequate thermal and mechanical resistance of the polyester, polyamide or polyacrylonitrile fibers. The processing temperature of from about 230 to 270° C. necessary during injection molding of polypropylene and the material shearing occurring in screw injection molding machines during homogenization and during flow through hot channels and narrow gates resulted in considerable thermal damage to the fibers. Furthermore, these shear forces, in combination with the high temperature, in some cases even caused degradation of the fiber geometry.

Organic fibers, such as wool or cotton, proved to be more resistant with respect to shearing. However, discoloration occurred at the conventional processing temperature, even after a short residence time in the injection-molding machine, as a consequence of thermal load, resulting in a brown coloration and partial decomposition during production interruptions.

It has now been found that the object can be achieved by use of carbon fibers.

The use of carbon fibers to reinforce polymers is known per se. Usually, amounts of from 10 to 20% of cut carbon fibers are added to polymers in order to achieve a significant improvement in the mechanical properties (flexural strength, etc).

The invention thus relates to a polypropylene molding composition for the production of moldings having a decorative effect, containing a polymer of propylene and from 0.3 to 3% by weight, based on the molding composition, of carbon fibers having a fiber length of from 0.5 to 18 mm.

The base material for the molding composition according to the invention comprises
 a) from 95 to 50% by weight, preferably from 90 to 70% by weight, of isotactic polypropylene or copolymers of propylene containing up to 15% by weight of ethylene,
 b) from 5 to 50% by weight, preferably from 10 to 30% by weight, of rubber-like copolymers which are compatible with polypropylene, and
 c) from 10 to 50% by weight, preferably from 10 to 40% by weight, of reinforcing fillers.

Preference is given to a homopolymer or copolymer of propylene having a melt flow index MFI 230/5 in accordance with DIN 53 735 of from 1 to 95 g/10 min.

Suitable rubber-like copolymers are, in particular, amorphous copolymers comprising from 30 to 70% by weight of ethylene and from 70 to 30% by weight of propylene, terpolymers of ethylene, propylene and up to 5% by weight of dienes, preferably ethylidenenorbornene or 1,4-hexadiene, copolymers of ethylene and from 10 to 45% by weight of vinylacetate, or block copolymers of styrene and butadiene or styrene and isoprene, with polystyrene blocks at both ends of the molecule.

The reinforcing fillers employed are preferably talc, chalk, glass fibers or glass beads.

The decorative material employed is carbon fibers having a length of 0.5 to 18 mm, preferably 1 to 6 mm. The amount added is from 0.5 to 3%, preferably from 1 to 2%, based on the total molding composition.

The molding composition according to the invention may furthermore contain the conventional additives which simplify processing and improve the physical properties. Examples which may be mentioned are light and heat stabilizers, antioxidants, antistatics, lubricants, and colored pigments and flameproofing agents. The first group is generally present in the molding composition in an amount of from 0.01 to 5% by weight, calculated on the amount of polymer (plus filler). Fillers, colored pigments and flameproofing agents are employed in an amount corresponding to requirements.

The processing conditions for the molding composition according to the invention correspond to the conditions normally used in the processing of polypropylene. The processing temperatures, measured immediately after the composition leaves the nozzle, are in the range from 240 to 280° C., depending on the size and complexity of the molding. The mold temperature is generally from 40 to 70° C.

For the production of particularly large-area moldings which are difficult to process, particularly high processing temperatures may also be selected for these articles without impairment of color or properties taking place.

An optimum effect is obtained when pale-colored, preferably white, gray, blue or brown, polymers are used. This effect can also be influenced by surface treatment of the moldings.

Suitable processing methods are, for example, injection molding, extrusion and extrusion blow molding.

The examples below serve to illustrate the invention:

Example 1

A trim of an A column in a European medium-sized car, having a length of 1220 mm, a width of 76 mm and a wall thickness of 2.3 mm, was produced by injection molding. The injection was carried out centrally over 3 point gates, ø 1.5 mm, arranged 12 mm apart. In order to achieve satisfactory filling of the 2-cavity mold in spite of the long flow path, a melt temperature of 270 to 275° C. had to be used. An injection-molding machine with a locking force of 1300 kN was used. The screw diameter was 90 mm. The temperatures set in the barrel were (starting at the feed hopper): 240, 260, 280, 280, 294° C. Overall cycle time: 60 seconds.

The material used was a PP copolymer containing 20% of talc and having an MFI 230/5 of 55 g/10 min in a pale gray base coloring, to which 2% of carbon fibers, length 6 mm, ø 22 μm, had been admixed. The desired visual matching of the column trim provided with a fine grain structure to the adjacent textile-laminated headliner was achieved fully. The production reliability was as required, in spite of the relatively high melt temperature necessary; even during production interruptions, no color shift or change in properties caused by the addition of the fibers had occurred.

Example 2

For the production of a car door pocket with integrated loudspeaker grille, a PP copolymer reinforced with 15% of short glass fibers and with a pale blue base coloration and an addition of 1% by weight of carbon fibers, fiber length 3 mm, ø 6 μm, was used. Due to the filigree design of the grille and consequently the conditions which were difficult for injection molding (thin webs, long flow paths, numerous weld lines), material temperatures of greater than 265° C. were necessary. Impairment of the good impact strength required did not occur on the finished parts. No change in color caused by the addition of the fibers was evident even on variation of the processing temperature and time.

Example 3

For the production of a coffee-machine housing, a PP homopolymer containing 10% of talc and 1% of carbon fibers, fiber length 1 mm, ø 8 μm, in a pale-brown base coloration was used. The housing is produced in one piece, with the base and lid connected to the central part via film hinges. These film hinges represent significant barriers from an injection point of view, and are extremely difficult to overcome. Therefore, polypropylene having an MFI 230/5 of 85 g/10 min and a material temperature of 265° C. were selected. This allowed the mold to be filled optimally. In spite of the relatively high material temperature and the material shearing occurring at the narrow points of the film hinges, no color changes or material damage occurred.

Example 4

Hand rails for the interior of commercial vehicles were produced on an extrusion blow molding machine (screw diameter 45 mm). The material employed was a high-molecular-weight PP copolymer, MFI 230/5=0.5 g/10 min, in a white base coloration, to which 0.5% by weight of carbon fibers, fiber length 18 mm, ø 12 μm, had been admixed. The material temperature was 220° C. As a consequence of the process, the fibers were preferentially oriented in the longitudinal direction (i.e. in the melt ejection direction). This orientation caused a clear, decorative effect in combination with a fine surface structure.

What is claimed is:

1. A polypropylene molding composition for the production of moldings having a decorative surface appearance, containing a polymer of propylene, from 0.3 to 3% by weight, based on the molding composition, of carbon fibers having a fiber length of from 0.5 to 18 mm, and from 10 to 50% by weight, based on the molding composition, of talc.

2. The molding composition as claimed in claim 1, wherein said polymer of propylene comprises:
   a) from 50 to 95% by weight of isotactic polypropylene or a copolymer of propylene with up to 10% by weight of ethylene; and
   b) from 5 to 50% by weight of an ethylene/propylene rubber which is compatible with polypropylene.

3. The molding composition as claimed in claim 2, wherein said polymer of propylene comprises:
   a) from 70 to 90% by weight of isotactic polypropylene or a copolymer of propylene with up to 15% by weight of ethylene; and
   b) from 10 to 30% by weight of an ethylene/propylene rubber which is compatible with polypropylene.

4. The molding composition as claimed in claim 1, wherein the amount of talc is from 10 to 40% by weight.

5. The molding composition as claimed in claim 2, wherein the amount of talc is from 10 to 40% by weight.

6. The molding composition claimed in claim 4, the polymer of propylene is colored in a pale base coloration.

7. The molding composition as claimed in claim 1, wherein the polymer of propylene is colored in a pale base coloration.

8. A polypropylene molding composition for the production of moldings having a decorative surface appearance, containing unmodified polymer of propylene, from 0.3 to 3% by weight, based on the molding composition, of carbon fibers having a fiber length of from 0.5 to 18 mm, and from 10 to 50% by weight, based on the molding composition, of talc.

9. The molding composition as claimed in claim 8, wherein said unmodified polymer of propylene comprises:
   from 50 to 95% by weight of isotactic polypropylene or a copolymer of propylene with up to 10% by weight of ethylene; and
   from 5 to 50% by weight of an ethylene/propylene rubber which is compatible with polypropylene.

10. The molding composition as claimed in claim 9, wherein said unmodified polymer of propylene comprises:
    from 70 to 90% by weight of isotactic polypropylene or a copolymer of propylene with up to 15% by weight of ethylene; and
    from 10 to 30% by weight of an ethylene/propylene rubber which is compatible with polypropylene.

11. The molding composition as claimed in claim 8, wherein the amount of talc is from 10 to 40% by weight.

12. The molding composition as claimed in claim 9, wherein the amount of talc is from 10 to 40% by weight.

13. The molding composition as claimed in claim 11, wherein the polymer of propylene is colored in a pale base coloration.

14. The molding composition as claimed in claim 8, wherein the polymer of propylene is colored in a pale base coloration.

15. The molding composition as claimed in claim 1, wherein the carbon fibers are present in an amount from 1 to 2% by weight, based on the molding composition.

16. The molding composition as claimed in claim 1, wherein the carbon fibers are present in an amount from 1 to 2% by weight, based on the molding composition.

\* \* \* \* \*

UNITED STATES PATENT AND TRADEMARK OFFICE
CERTIFICATE OF CORRECTION

PATENT NO. : 6,747,086 B2
DATED : June 8, 2004
INVENTOR(S) : Guebitz et al.

It is certified that error appears in the above-identified patent and that said Letters Patent is hereby corrected as shown below:

Title page,
Item [56], References Cited, FOREIGN PATENT DOCUMENTS, the following references should be added: -- JP 4-8767 --; -- JP 60-17182, dated 1/29/85 --; and -- JP 6411163, dated 1/13/89 --.

Column 4,
Line 39, after "claim 4," insert -- wherein --.

Signed and Sealed this

Third Day of August, 2004

JON W. DUDAS
*Acting Director of the United States Patent and Trademark Office*